United States Patent
Cai et al.

(10) Patent No.: US 11,653,126 B2
(45) Date of Patent: May 16, 2023

(54) METHOD AND SYSTEM FOR MOVING STATUS DETECTION FOR A SENSOR APPARATUS

(71) Applicant: BlackBerry Limited, Waterloo (CA)

(72) Inventors: Zhijun Cai, Ashburn, VA (US); Shouxing Qu, Gloucester (CA); Yu Gao, Waterloo (CA); Gaëlle Christine Martin-Cocher, Toronto (CA); Jesse William Bennett, Apex, NC (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/303,123

(22) Filed: May 20, 2021

(65) Prior Publication Data

US 2021/0281931 A1    Sep. 9, 2021

Related U.S. Application Data

(63) Continuation of application No. 15/949,747, filed on Apr. 10, 2018, now Pat. No. 11,035,873.

(51) Int. Cl.
| | |
|---|---|
| H04Q 9/00 | (2006.01) |
| G01P 15/14 | (2013.01) |
| G01P 1/00 | (2006.01) |
| G06Q 10/08 | (2012.01) |
| G06Q 10/0833 | (2023.01) |

(52) U.S. Cl.
CPC .............. *H04Q 9/00* (2013.01); *G01P 1/06* (2013.01); *G01P 15/14* (2013.01); *G06Q 10/0833* (2013.01); *H04Q 2209/40* (2013.01); *H04Q 2209/883* (2013.01)

(58) Field of Classification Search
CPC .. H04Q 9/00; G01P 1/06; G01P 15/14; G06Q 10/0833
See application file for complete search history.

(56) References Cited

U.S. PATENT DOCUMENTS

| 2002/0017989 | A1 | 2/2002 | Forster et al. | |
| 2010/0267375 | A1* | 10/2010 | Lemmon | G06F 21/74 455/418 |

(Continued)

FOREIGN PATENT DOCUMENTS

| JP | 2012-523987 A | 10/2012 |
| JP | 2015-520839 A | 7/2015 |

(Continued)

OTHER PUBLICATIONS

Japan Patent Office, Notice of Reasons for Refusal for JP 2020-555098 dated Sep. 17, 2021 (including Translation) (17 pages).

(Continued)

*Primary Examiner* — Michael J Dalbo
(74) *Attorney, Agent, or Firm* — Trop, Pruner & Hu, P.C.

(57) ABSTRACT

A method at a sensor apparatus, the method including calculating a value for a target function based on at least one sensor of the sensor apparatus; determining that the value of the target function is within a defined threshold range for a defined time period, thereby finding an in-flight state for the sensor apparatus; and turning off transmission from a radio of the sensor apparatus based on the in-flight state.

19 Claims, 9 Drawing Sheets

(56) References Cited

U.S. PATENT DOCUMENTS

| | | | |
|---|---|---|---|
| 2013/0102323 A1* | 4/2013 | Czompo | G01S 19/34 |
| | | | 702/141 |
| 2015/0027226 A1 | 1/2015 | Turon | |
| 2016/0095150 A1* | 3/2016 | Howe-Ryberg | H04L 67/12 |
| | | | 455/90.3 |
| 2017/0075020 A1 | 3/2017 | Gann | |
| 2017/0104864 A1 | 4/2017 | Tanabe et al. | |
| 2017/0352235 A1 | 12/2017 | Lai | |
| 2018/0172722 A1 | 6/2018 | He | |
| 2018/0183643 A1 | 6/2018 | Kang | |
| 2019/0103007 A1 | 4/2019 | Tan | |

FOREIGN PATENT DOCUMENTS

| | | |
|---|---|---|
| JP | 2017020859 A | 1/2017 |
| WO | 2013/044399 A1 | 4/2013 |
| WO | WO-2013044399 A1 * | 4/2013 ........ H04M 1/72577 |
| WO | 2013/131072 A2 | 9/2013 |
| WO | 2014/010727 A1 | 1/2014 |

OTHER PUBLICATIONS

European Patent Office, International Search Report and Written Opinion for PCT/US2019/026479 dated Jun. 24, 2019 (11 pages).

Bakunowicz, Jerzy & Rzucidto, Pawet. (2016). Coupling of MEMS gyroscope application with wavelet analysis for detection of airframe oscillations in flight conditions. 10.5162/etc2016/2.2. (Year: 2016) (11 pages).

Japan Patent Office, Notice of Reasons for Refusal for JP 2020-555098 dated Feb. 28, 2022 (including Translation) (5 pages).

Japan Patent Office, Notification of Reasons for Refusal for Patent Application No. 2020-555098 dated Jul. 15, 2022 (5 pages).

European Patent Office, Extended European Search Report for Appl. No. 22214457.8 dated Mar. 24, 2023 (7 pages).

* cited by examiner

METHOD AND SYSTEM FOR MOVING STATUS DETECTION FOR A SENSOR APPARATUS

CROSS REFERENCE TO RELATED APPLICATIONS

This is a continuation of U.S. application Ser. No. 15/949,747, filed Apr. 10, 2018, the content of which is hereby incorporated by reference.

FIELD OF THE DISCLOSURE

The present disclosure relates to the transportation of goods, and in particular relates to sensor apparatuses for the transportation of goods.

BACKGROUND

During the transportation of goods, a sensor apparatus may be affixed to a shipping container. For example, such shipping container may include a vehicle, transportation container, transportation box, aviation box, consumer luggage, among other options. The sensor apparatus may be used for fleet management, cargo monitoring, cargo status detection, among other options.

The sensor apparatus may be equipped with a variety of sensors or allow communication with a variety of sensors. Examples of such sensors may include, but are not limited to, location sensors such as a Global Navigation Satellite System (GNSS) sensors, accelerometers, gyroscopes, temperature sensors, light sensors, door opening sensors, Automatic Dependent Surveillance-Broadcast (ADS-B) receiver, among other options. A communication system on the sensor apparatus may allow communication of sensor data from the sensor apparatus to a network based server.

However, if a container is ever to be transported by air, it is important that the sensor apparatus knows when the container is airborne in order to turn off communication functionality on the sensor apparatus. In particular, the Federal Aviation Administration (FAA) in the United States has regulations prohibiting communications equipment from operating when an aircraft is airborne. Similar regulations exist in other jurisdictions.

BRIEF DESCRIPTION OF THE DRAWINGS

The present disclosure will be better understood with reference to the drawings, in which.

DETAILED DESCRIPTION

The present disclosure provides a method at a sensor apparatus, the method comprising: calculating a value for a target function based on at least one sensor of the sensor apparatus; determining that the value of the target function is within a defined threshold range for a defined time period, thereby finding an in-flight state for the sensor apparatus; and turning off transmission from a radio of the sensor apparatus based on the in-flight state.

The present disclosure further provides a sensor apparatus comprising: a processor; and a communications subsystem, wherein the sensor apparatus is configured to: calculate a value for a target function based on at least one sensor of the sensor apparatus; determine that the value of the target function is within a defined threshold range for a defined time period, thereby finding an in-flight state for the sensor apparatus; and turn off transmission from a radio at the communications subsystem of the sensor apparatus based on the in-flight state.

The present disclosure further provides a computer readable medium for storing instruction code, which, when executed by a processor on a sensor apparatus cause the sensor apparatus to: calculate a value for a target function based on at least one sensor of the sensor apparatus; determine that the value of the target function is within a defined threshold range for a defined time period, thereby finding an in-flight state for the sensor apparatus; and turn off transmission from a radio at the communications subsystem of the sensor apparatus based on the in-flight state.

In the transportation of shipping containers, it is important to determine when a trailer or box is in flight, since radio transmissions from the sensor apparatus need to be turned off due to FAA regulations or other similar regulations under specific conditions. Existing apparatuses do not provide accurate estimations of in-flight status, and also have difficulties to differentiate an in-flight status from a general moving status. For example, it is difficult to determine whether the sensor apparatus is in flight or moving on a highway. For example, even relying on an altitude may not be sufficient to determine whether the container is in flight depending on location.

Therefore, in accordance with the embodiments described below, algorithms are provided which will detect in-flight status based on generally available sensor data, such as measurement data from accelerometers and in some embodiments from gyroscopic sensors.

Sensor systems may be included on the vehicle or shipping containers for a variety of reasons. For example, a plurality of sensor apparatuses may operate remotely from a central monitoring station to provide remote sensor data to a management or monitoring hub. One sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, operational parameters such as tire pressure, noise level or engine temperature, that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, aircraft such as an airplane, helicopter, airship, blimp, among others, and can further include a trailer, shipping container or other such cargo moving container, whether attached to a motorized vehicle or not.

In other embodiments, the sensor apparatus may be secured to a container for moving items, such as a shipping box, parcel, luggage, among other options.

In accordance with the embodiments described herein, a sensor apparatus may be any apparatus or computing device that is capable of providing data or information from sensors associated with the sensor apparatus to a central monitoring or control station. Sensors associated with the sensor apparatus may either be physically part of the sensor apparatus, for example a built-in global positioning system (GPS) chipset, or may be associated with the sensor apparatus through short range wired or wireless communications. For example, a sensor may provide information through a Bluetooth™ Low Energy (BLE) signal from the sensor to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses.

Figure 1:
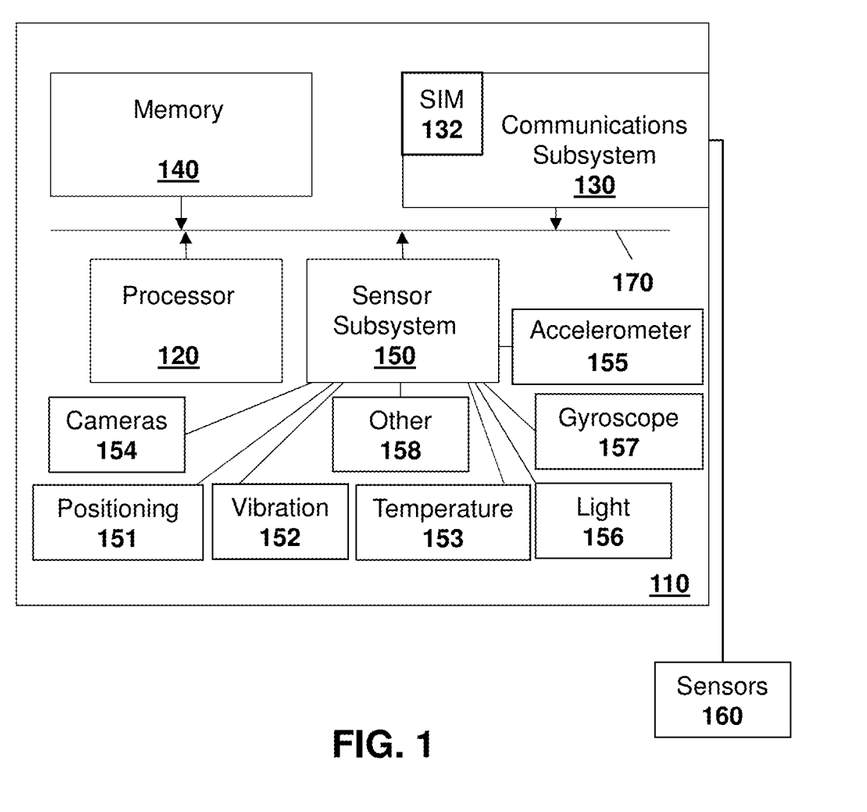
FIG. 1 is block diagram showing an example sensor apparatus.

One sensor apparatus is shown with regard to FIG. 1. The sensor apparatus of FIG. 1 is however merely an example and other mobile devices could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), ADS-B, near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors 154, accelerometers 155, light sensors 156, gyroscopic sensors 157, and other sensors 158. Other sensors may be any sensor that is capable of reading or obtaining data that may be useful for sensor apparatus 110. In other cases, the sensors may be external to the sensor apparatus 110 and communicate with sensor apparatus using communications subsystem 130. One such sensor is shown as sensor 160.

However, the sensors shown in the embodiment of FIG. 1 are merely examples, and in other embodiments different sensors or a subset of sensors shown in FIG. 1 may be used. For example, in one embodiment of the present disclosure, only accelerometers or gyroscopic sensors are provided.

The positioning sensor may use a positioning subsystem such as a Global Navigation Satellite System (GNSS) receiver which may be, for example, a Global Positioning System (GPS) receiver (e.g. in the form of a chip or chipset) for receiving GPS radio signals transmitted from orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques, WPS, and/or ADS-B may also be used in conjunction with GPS in a hybrid positioning system Further, the sensor apparatus 110 of FIG. 1 may, in some embodiments, act as a gateway, and may communicate with other sensor apparatuses (not shown) on the trailer, where the other sensor apparatuses may act as hubs for a subset of the sensors on the vehicle or trailer.

Communications between the various elements of sensor apparatus 110 may be through an internal bus 170 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other examples, sensor apparatus 110 could be carried by a user.

Such sensor apparatus 110 may be a power limited device. For example sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
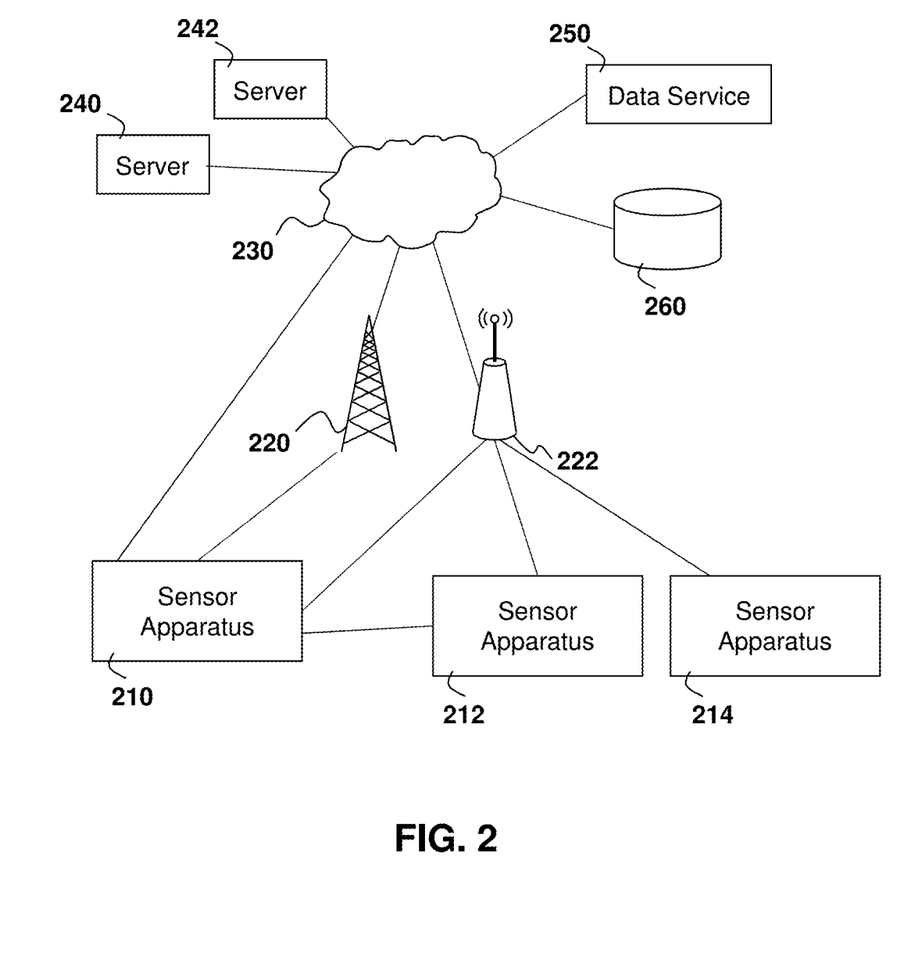
FIG. 2 is a block diagram showing an example environment for the operation of the sensor apparatus of FIG. 1.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point. For example, access point 222 may be a WiFi router or a private router network. Also, a private router network may have a path from the access point name (APN) to a server, and may reduce network latency based on a location of the sensor apparatus in some embodiments.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with image capture apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, system information such as pressure or vibration sensor readings, any unusual events including sudden decelerations, temperature warnings when the temperature is either too high or too low, among other data. The server 240 may compile such information and store it for future reference. It may further alert an operator. For example, entry of the vehicle into a restricted geofenced area may provide a warning to operators.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current weather conditions.

Data repository or database 260 may for example provide information such as image data associated with a particular location, aerial maps, low latency access point names, virtual SIM information, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 for processing at those sensor apparatuses.

Utilizing the system from FIGS. 1 and 2 above, cargo monitoring systems are enabled. However, as indicated above, the sensor apparatus may need to turn off wireless transmission for communications when the container or cargo box associated with the sensor apparatus is in flight due to FAA regulations or other similar regulations. Further, communication functionality should be restored when the container or cargo box is back on the ground or below a certain altitude.

In accordance with the embodiments described below, in one alternative, a sensor apparatus will have access to output provided accelerometers. For example, in one case the sensor apparatus would have access to three accelerometers, one for each of the x, y, and z directions respectively. It is assumed that the signals provided by the accelerometers are always available. Further, in some embodiments below, the sensor apparatus will have access to outputs from three gyroscopic sensors, one for each of the x, y, and z directions respectively.

Figure 3:
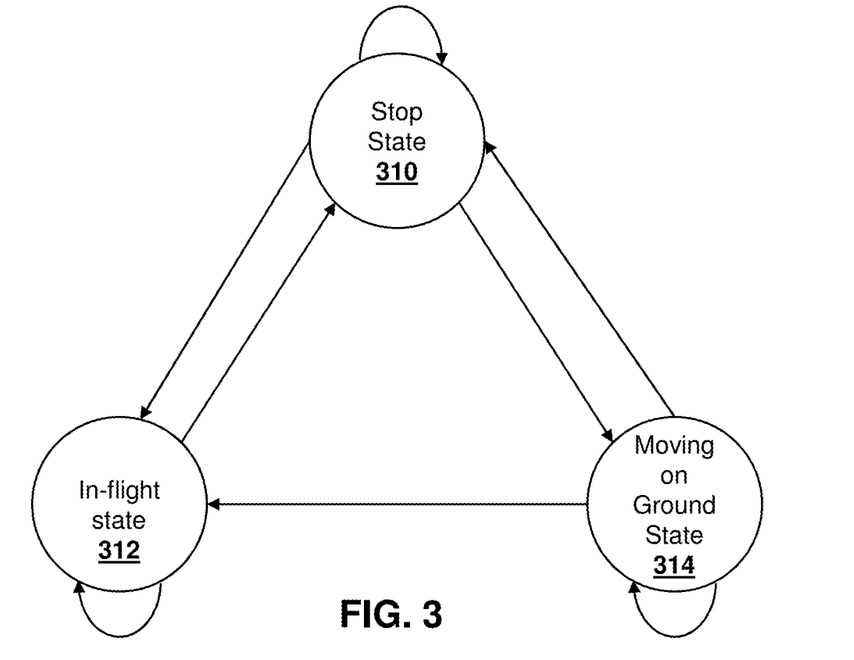
FIG. 3 is a state diagram for states and transitions between states for the sensor apparatus.

In accordance with a first embodiment of the present disclosure, the sensor apparatus and cargo box or container that the sensor apparatus is associated with can be in one of three states. Specifically, reference is now made to FIG. 3. As seen in the embodiment of FIG. 3, the sensor apparatus may be in a stopped state 310. In the stopped state, the cargo box or container with the sensor apparatus is motionless. For example, this could be the state in which the cargo box or container is waiting to be loaded onto a vehicle such as a truck or airplane. It may further include the period where the airplane is on the runway waiting to taxi or take off. It may further include other instances where the cargo box or container is being stored for delivery, for example in a truck yard or in a warehouse. Other examples are possible.

The sensor apparatus may further be in a flying state 312. The flying state 312 is when the cargo box or container and associated sensor apparatus is on a flying airplane or aircraft.

The sensor apparatus may further be in a moving on the ground state 314. The moving on the ground state may include moving in a truck, on a ship, when the airplane is taxiing among other options, but exclude moving in a flying airplane or aircraft.

From the embodiment of FIG. 3, a cargo box or container with the sensor apparatus may for example start in a state 310. The transitions possible from state 310 include staying in state 310 or transitioning to state 312 or state 314. The transition conditions for transitioning to such states are described below.

Similarly, from state 312, the sensor apparatus may stay in a state 312, or transition to state 310.

From state 314, the sensor apparatus may stay in state 314 or may transition to state 310. Typically, a transition from state 314 directly to state 312 would not be possible. However, in the embodiment of FIG. 3, a state transition from state 314 to state 312 is provided to allow for a fast transition between states 314 and state 312 if it is erroneously detected that the sensor apparatus is in state 314 when it should be in state 312.

Such states transitions are, for example, illustrated in Table 1 below, which shows an "x" for the possible states transitions.

TABLE 1

| | State Transitions | | |
|---|---|---|---|
| | | New State | |
| Old State | State 310 | State 312 | State 314 |
| State 310 | X | X | X |
| State 312 | X | X | N/A |
| State 314 | X | X | X |

Thus, as seen in Table 1 above, the state transition from state 312 to state 314 is not possible in accordance with the state diagram of FIG. 3.

Based on FIG. 3 and Table 1 above, several observations may be made. First, if the sensor apparatus is in state 312, then for the next state, the sensor apparatus only needs to check whether the state is unchanged or whether the state has changed to stopped state 310. No check needs to be made whether the sensor apparatus has changed from state 312 to state 314.

A second observation is that when the sensor apparatus is in state 312, this state status does not need to be checked at every following sample moment. Instead, detection may be stopped and then resumed after a certain skipped time duration.

A third observation is that if the sensor apparatus is in state 314 for a moving ground vehicle, then a check needs to be made whether the state is unchanged, whether the state is changed to stop state 310, or whether the state is changed to the flying state 312. Detection should be performed at every sampling moment whenever the sensor apparatus is in state 314.

A fourth observation is that when the sensor apparatus is in state 310, a check needs to be made whether the state is unchanged, changed to state 312 for a moving airplane, or changed to state 314 for a moving truck or ground vehicle. Detection should be performed at every sampling moment whenever the sensor apparatus is in state 310.

In one alternative, the states transitions may be determined based on a defined target function $f(k)$. The target function $f(k)$ is based on at least one accelerometer or gyroscope, which is calculated at every sampling moment k.

In one example, the target function $f(k)$ is the summation of the moving variance (MV) of three accelerometers mvACCE(k). This summation is shown as equation 1 below.

$$f(k) = mvACCE(k) = \sum_{i=1}^{3} mv_{acce_i}(k) \qquad (1)$$

In equation 1 above, i equals 1, 2 and 3 for the x, y and z directions respectively.

In another example, $f(k)$ is a weighted summation of the moving variance of the three accelerometers. This is shown as equation 2 below.

$$f(k) = \sum_{i=1}^{3} \alpha(i) * mv_{acce_i}(k) \quad (2)$$

In equation 2 above, $\alpha(i)$ is a weighting factor for each of the three accelerometer outputs. Different weights could be given to the three accelerometer outputs corresponding to the x, y and z directions respectively. For examples, larger weights may be given to the x or z directions.

In still a further embodiment, the target function $f(k)$ could be the summation of the second order of difference of the moving variance of the three accelerometers.

Other examples of target functions are possible. In the present disclosure, the equation 1 target function will be used for illustration purposes. However, the present disclosure is not limited to the use of the equation 1 target function.

In some of the embodiments described below, the moving variance of the three gyroscopic sensors mvGYRO(k) may also be used. However, the use of such moving variance from gyroscopic sensors is optional since the output signals from the gyroscopic sensors may not always be available. For example, the gyroscopic sensors may only be turned on for a short duration when necessary and, in this case, the moving variance from the gyroscopic sensors may only be available when such gyroscopic sensors are turned on.

From State 310

In a first embodiment, the moving threshold from equation 1 above may be utilized. In this regard, a vehicle may start in state 310 and make determinations on transitions.

In the initial state 310 when the vehicle is stopped, for a time index of k, where k is greater than zero, the following operations are performed.

Figure 4:
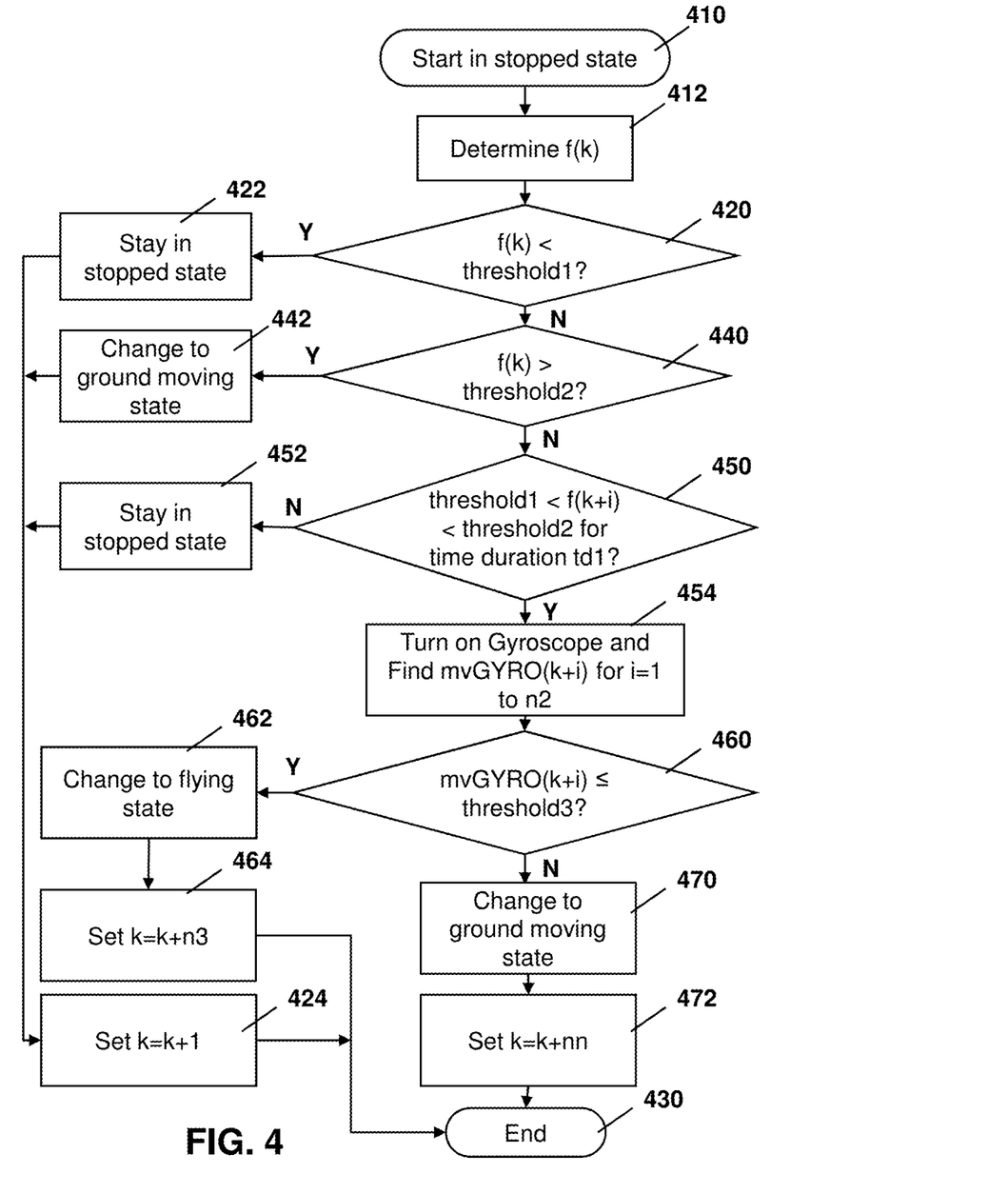
FIG. 4 is a process diagram for transitions from the stopped state.

In particular, reference is now made to FIG. 4, which shows a process when the sensor apparatus is in a stopped state. The process of FIG. 4 starts at block 410 and proceeds to block 412 in which a value for the target function $f(k)$ is calculated for the current k.

The process then proceeds to block 420 in which a check is made to determine whether the calculated value for the target function from block 412 is less than a first threshold, denoted threshold1. If yes, the process then proceeds to block 422 in which the state remains as the stopped state.

From block 422 the process proceeds to block 424 in which the value of k is incremented to the next sampling moment by setting k=k+1. From block 424 the process proceeds to block 430 and ends.

Conversely, from block 412, if the value of the target function is greater than the first threshold, the process proceeds to block 440 in which a check is made to determine whether the value of the target function is also greater than a second threshold, denoted threshold2, where threshold2>threshold1.

From block 440, if the value of the target function is greater than the second threshold then the process proceeds to block 442 in which the state is changed to the ground moving state 314 from FIG. 3. The process then proceeds to block 424 in which the next detection time period is incremented by one to indicate that in the ground moving state the check is made at each sampling period. The process then proceeds to block 430 and ends.

Conversely, from block 440, if the value of the target function is not greater than the second threshold, this indicates that the value of the target function is between the first threshold and the second threshold. The process then proceeds to block 450.

At block 450, a check is made to determine whether the value of the target function falls between the two thresholds continuously and consistently for an extended period. In particular, a check is made pursuant to equation 3.

$$threshold1 \leq f(k+i) \leq threshold2 \quad (3)$$

Where i in equation 3 is a duration from 1 to n1, wherein n1 is a positive integer corresponding to a predetermined time duration td1.

From block 450, if the value of the target function is not between the two thresholds for the extended time duration, then the process proceeds to block 452. At block 452, the process stays in the stopped state. The process then proceeds to block 424 in which the sampling moment interval is set to the next sampling moment. In particular, k=k+1 as shown at block 424. From block 424 the process proceeds to block 430 and ends.

Conversely, if the value of the target function is between the two thresholds for the extended time duration, then in one embodiment the state of the sensor apparatus is changed to the flying state 312 from FIG. 3 above. Then, the next sampling moment is set to k=k+n3.

Optionally in another embodiment, if the value of the target function is between the two thresholds for the extended time duration, the process proceeds from block 450 to block 454. At block 454, the gyroscopic sensors on the sensor apparatus are turned on to start to calculate the moving variance of the gyroscopic sensors, denoted as mvGYRO.

Specifically, at block 454, a value for the moving variance for the gyroscopic sensors over an extended time period mvGYRO(k+i) is calculated. In this case, i is a number from 1 to n2, and n2 is a positive integer corresponding to a predetermined time duration td2.

From block 454 the process proceeds to block 460 in which a check is made to determine whether the value of the moving variance for the gyroscopic sensors for the extended time duration is less than or equal to a third threshold, denoted threshold3.

If the value of the moving variance of the gyroscopes for the extended time duration is less than or equal to the third threshold then the process proceeds from block 460 to block 462 in which the state of the sensor apparatus is changed to the flying state 312 from FIG. 3 above.

From block 462 the process proceeds to block 464 in which the sampling may be changed from every period to a time duration n3. Therefore, the next sampling moment is set to k=k+n3 at block 464.

From block 464 the process proceeds to block 430 and ends.

Conversely, if the value of the moving variance of the gyroscope is not consistently and continuously less than or equal to the third threshold for the time duration, the process proceeds from block 460 to block 470 in which the state is changed to the ground moving state 314 from FIG. 3 above.

The process then proceeds to block 472 in which the next sampling moment is set to k=k+nn, where nn is a positive integer greater than or equal to one sampling moment representing a time duration td3.

From block 472 the process proceeds to block 430 and ends.

From State 312

Figure 5:
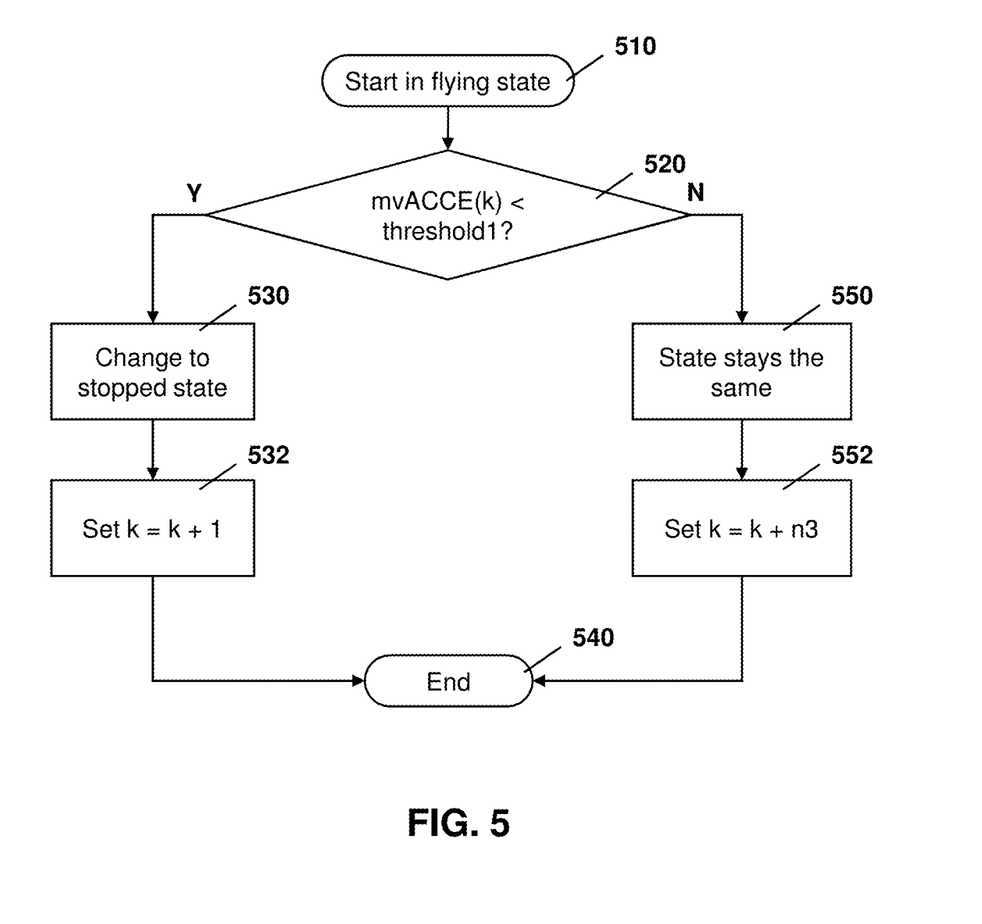
FIG. 5 is a process diagram for transitions from a flying state.

In a further case, if the current state is the flying state 312 from FIG. 3 above, then a state transition decision may be made in accordance with FIG. 5. Reference is now made to FIG. 5.

The process of FIG. 5 starts at block 510 and proceeds to block 520 in which a check is made to determine whether the value of the target function is less than the first threshold. If yes, then the process proceeds from block 520 to block 530 in which the state of the sensor apparatus is changed to the stopped state 310 from FIG. 3 above.

The process then proceeds to block 532 in which the next sampling moment is set to k=k+1.

From block 532 the process proceeds to block 540 and ends.

Conversely, if the value of the target function is greater than or equal to the first threshold, the process proceeds from block 520 to block 550 in which the sensor apparatus stays in the same state, namely the flying state.

From block 550 the process proceeds to block 552 in which the next sampling moment is set to k=k+n3.

From block 552 the process proceeds to block 540 and ends.

From State 314

In a further case, the previous state for the sensor apparatus may be the ground moving vehicle state 314 from FIG. 3 above. In this case, the process for determining state transition is shown with regard to FIG. 6.

Figure 6:
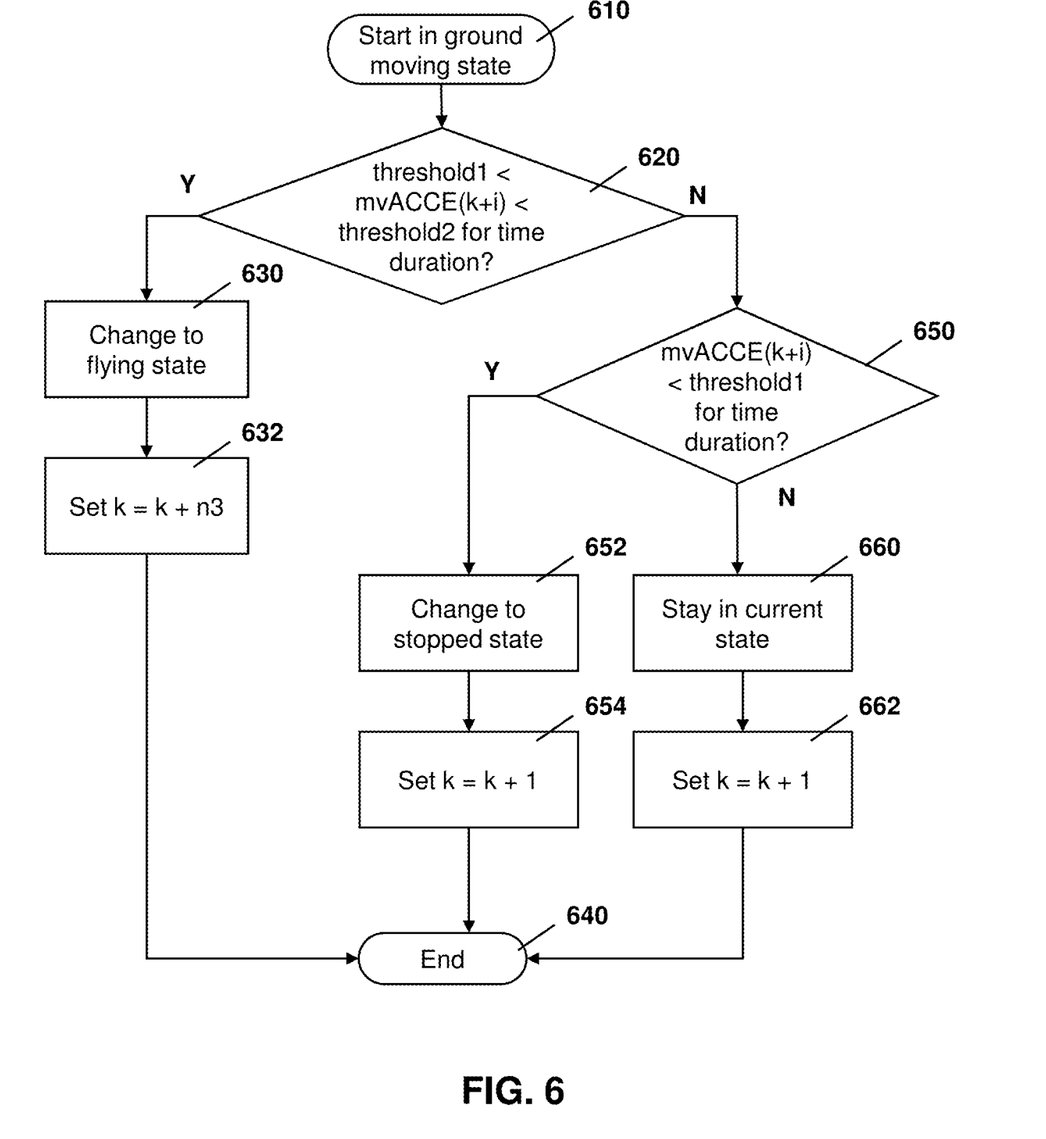
FIG. 6 is a process diagram for transitions from a ground moving state.

The process of FIG. 6 starts at block 610 and proceeds to block 620 in which a check is made to determine whether the value of the moving variance for the accelerometers is between two thresholds consistently and continuously for an extended time duration. The extended time duration is shown in the embodiment of the FIG. 6 with mvACCE(k+i), where i is an integer between 1 and n1.

If the determination at block 620 determines that the value of the target function is between the two thresholds for the time duration then the process proceeds to block 630 in which the state is changed to flying state 312 from FIG. 3 above.

From block 630 the process proceeds to block 632 in which the next sampling moment is set to k=k+n3, where n3 is an integer representing a time duration.

From block 632 the process proceeds to block 640 and ends.

Conversely, from block 620, if the value of the target function is not between two thresholds for the time duration then the process proceeds to block 650. At block 650 a check is made to determine whether the moving variance for the accelerometers is less than a first threshold for a time duration, where the time duration is represented by i and i is a value from one to n1.

If the target function at block 650 is less than the threshold for the time duration, the process proceeds from block 650 to block 652 in which the state is changed to the stopped state 310 from FIG. 3 above.

From block 652 the process proceeds to block 654 in which the next sampling moment is set to k=k+1.

From block 654 the process proceeds to block 640 and ends.

Conversely, from block 650, if the value of the target function is not less than the first threshold for the time duration then the process proceeds to block 660 in which the sensor apparatus may stay in its current state.

From block 660, the process proceeds to block 662 in which the next sampling moment is set to k=k+1.

From block 662 the process proceeds to block 640 and ends.

In the embodiments of FIGS. 4 to 6 above, if the state transition is into the flying state 312 then the radio subsystem of the sensor apparatus is turned off in order to ensure that aviation regulations are complied with. In some embodiments, prior to turning off the radio, a notification may be transmitted to a network element indicating that the sensor apparatus is transitioning to an in-flight state and that the radio transmission is being turned off.

Alternative Algorithms

While the determination of state transitions in FIG. 4 above include the moving variance for the gyroscopic sensors, in a first alternative embodiment a determination may be based only on accelerometers and no gyroscopic sensors used. In this case, multiple threshold values may be defined, namely threshold1, threshold2, threshold3 and threshold4.

In this case, the target function $f(k)$ is defined as the weighted summation of the moving variance of the three accelerometers. For example, equation 2 above may be utilized.

In equation 2, $\alpha(i)$ is the weight given to the moving variance for each of the three accelerometers. In one example, more weight may be given to the X direction and Z direction than the Y direction.

Where the target function $f(k)$ is greater than a threshold1, which may be a takeoff threshold and generally have a larger value, and the target function $f(k+i)$ is greater than the threshold2, where threshold2<threshold1 for i=1, ... K1 (take off confirm window), an in-flight status may be declared.

If the sensor apparatus is determined to be in-flight, when the target function $f(k)$ is greater than threshold3 and $f(k+i)$ is less than threshold4 for i=1, ... K2 (landing confirm window), a landing status is declared.

In one example, K1 could be a relatively smaller value and thus have a smaller determining delay, while K2 could be a larger value, since it is more important to promptly turn off the radio while it is generally acceptable to turn on the radio with a larger delay but with a more accurate estimation.

In one embodiment, in order to further differentiate a moving vehicle from moving in the air, a second target function is defined in accordance with the equation 4 below.

$$f_1(k) = \sin^{-1}(\sqrt{x^2+y^2}/9.8) \qquad (4)$$

In equation 4 above, x and y represent the magnitude of the accelerometer in the x and y direction respectively. If the value of $f_1(k)$ is greater than a fifth threshold, denoted as threshold5, during the takeoff confirm window, or the mean value over a pre-defined window is greater than threshold5 during the takeoff confirm window, the "in-flight" status is determined. Otherwise, the "moving on ground" status is determined.

In another example, to avoid in-flight false alarms, after it is determined that the sensor apparatus is in flight, the algorithm may periodically re-test whether the target function $f(k)$ is greater than threshold2 during the takeoff confirm window.

After in-flight status is determined, in one embodiment all communications except communication between accelerometers and the sensor apparatus are turned off in order to save battery power. The accelerometers are used to determine whether the landing event has occurred. Prior to disabling such communication, in one embodiment a notification may be sent to a network element such as a fleet management server.

In another embodiment, after the in-flight status is determined, all irrelevant functionalities such as the functionality for door open or close detection, among others, may be turned off.

In still a further alternative, algorithms may be combined. For example, in one embodiment at least two "inflight" detection methods may be combined, where in addition to any of the embodiments above, a second method may include monitoring ADS-B messages corresponding to the aircraft or flying engine. The sensor apparatus may then select the most conservative indication of 'in flight' status to turn the radios off or on.

Moving Variance

In the above, the moving variance may be determined through a variety of techniques. One example is described below with regard to a first order infinite impulse response (IIR) filter. In this case, the moving variance of a real number sequence $X=\{x_k\}$, $k=1, 2, \ldots, n$ can be calculated as follows, denoting the moving variance of X as $s=\{s_k\}$, $k=1, 2, \ldots, n$.

For the first time interval, in other words were k=1, equations 5a and 5b below apply.

$$\overline{x_1} = x_1 \quad (5a)$$

$$\overline{x_1^2} = x_1^2 \quad (5b)$$

In this case, the moving variance is denoted in equation 6 as $$s_1 = 0 \quad (6)$$

In the case where k>1, then equations 7a and 7b apply.

$$\overline{x_k} = (1-\alpha)\overline{x_{k-1}} + \alpha x_k \quad (7a)$$

$$\overline{x_k^2} = (1-\alpha)\overline{x_{k-1}^2} + \alpha x_k^2 \quad (7b)$$

In this case, the moving variance is calculated as equation 8 below.

$$s_k = \overline{x_k^2} - (\overline{x_k})^2 \quad (8)$$

In equation 7a and 7b above, $0<\alpha\leq1$ and a is the coefficient of the IIR filter.

Testing

Utilizing equation 1 and the embodiments of FIGS. 4 to 6 above, various tests were performed in the real world. In these tests, the IIR coefficient was set to 0.04. Further, the threshold1 was set to 0.01, threshold2 was set to 3 and threshold3 was set to 20.

Further, the time durations in the embodiments of FIGS. 4 to 6 were set to 30, 3 and 300 respectively.

Figure 7:
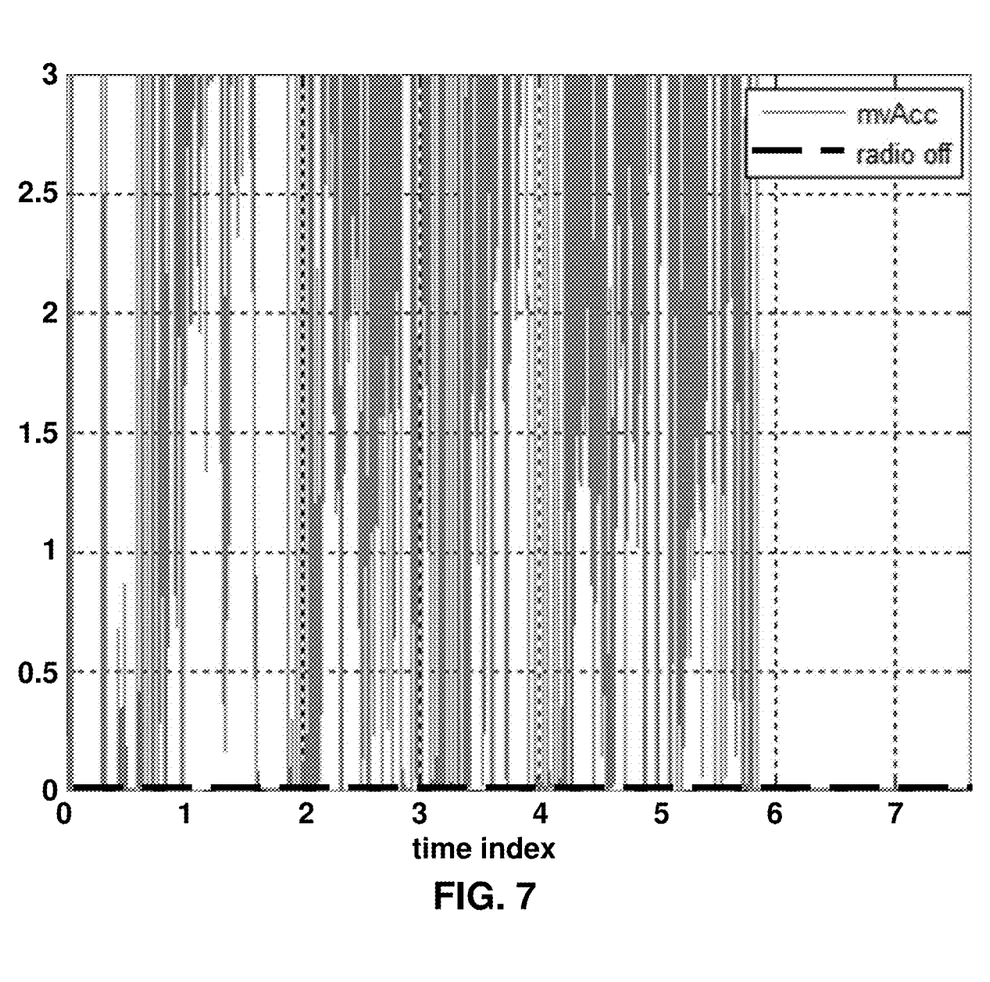
FIG. 7 is a plot of target function values while transporting a shipping container associated with the sensor apparatus using ground transportation.

In one case where the sensor apparatus associated with the shipping container was driven on the ground, the results were plotted as shown in FIG. 7. In this case, the MV values found were such that the state of the sensor apparatus was considered to be a ground vehicle moving state throughout the trial. Therefore the radio of the sensor apparatus remained on.

Figure 8:
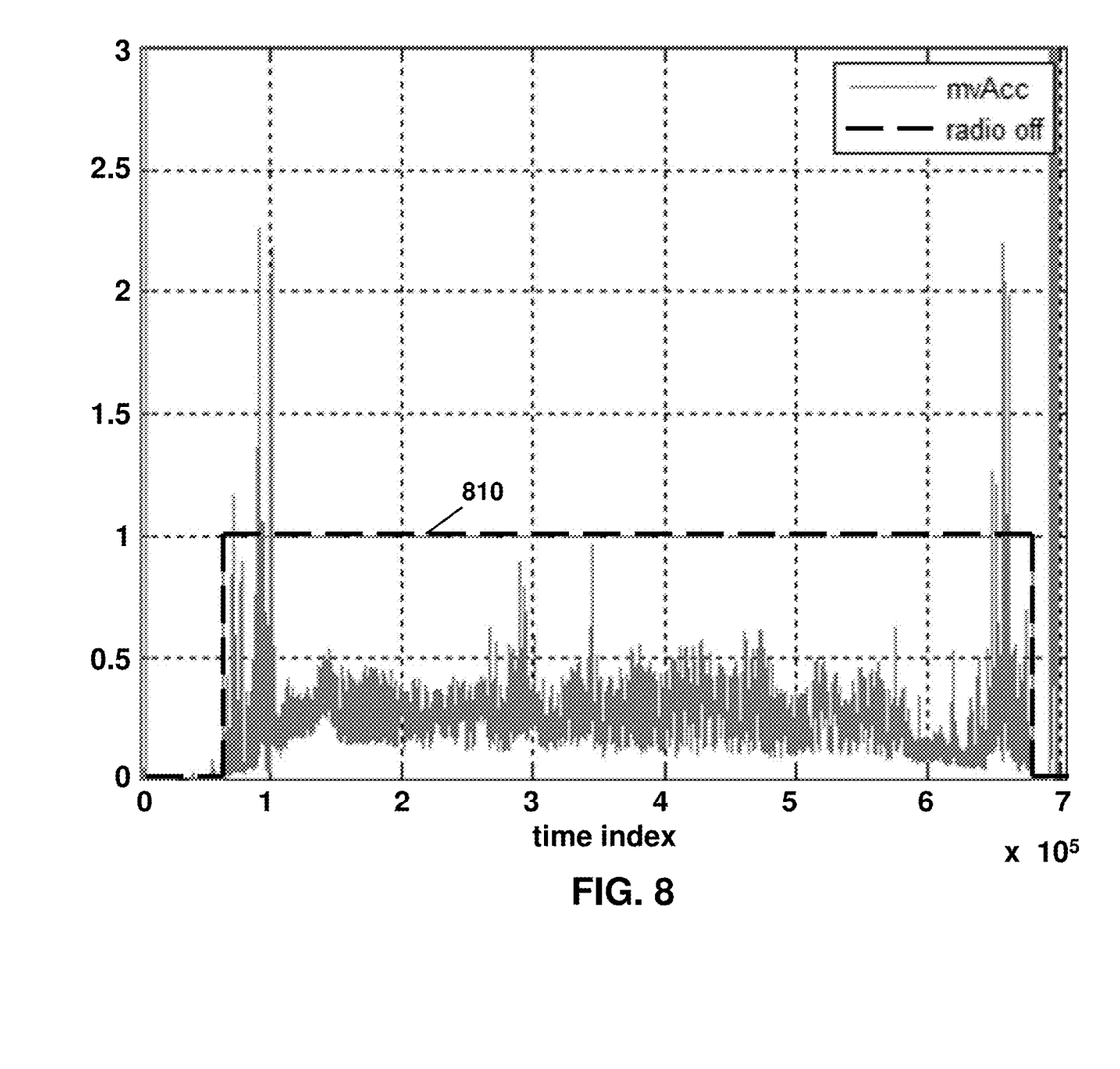
FIG. 8 is a plot of target function values while transporting a shipping container associated with the sensor apparatus in-flight.

In another case, the sensor apparatus was flown with the shipping container between airports. The results were plotted as shown by FIG. 8. As seen by line 810, the radio was turned off when a successful in-flight determination was made. Further, the radio was turned on again when a landing event occurred.

The above therefore provides for the use of a target function based on sensors associated with the sensor apparatus to make a determination about the state of the sensor apparatus. Specifically, if the target function is between two determined thresholds this indicates an in-flight state and the sensor apparatus may therefore turn off its radio.

A server such as servers 240, 242 or 250 may be any network node. For example, one simplified server that may perform the embodiments described above is provided with regards to FIG. 9.

Figure 9:
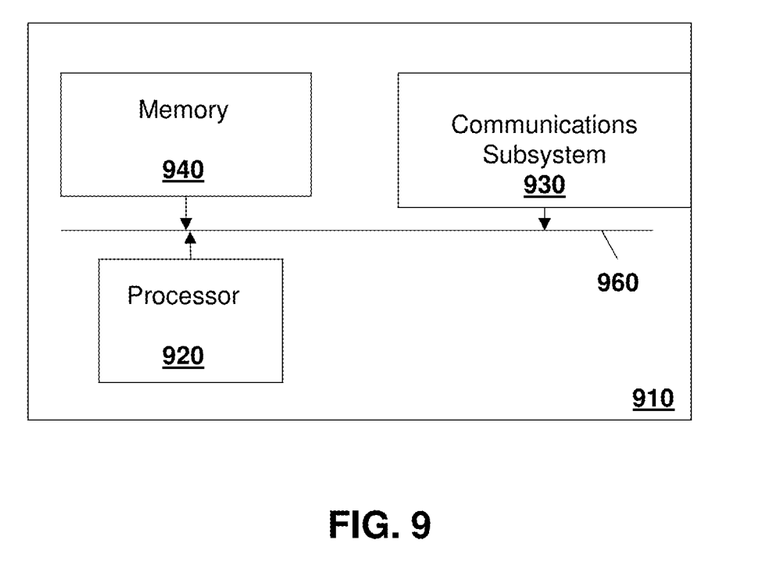
FIG. 9 is a block diagram of an example computing device capable of being used in accordance with the embodiments of the present disclosure.

In FIG. 9, server 910 includes a processor 920 and a communications subsystem 930, where the processor 920 and communications subsystem 930 cooperate to perform the methods of the embodiments described herein.

The processor 920 is configured to execute programmable logic, which may be stored, along with data, on the server 910, and is shown in the example of FIG. 9 as memory 940. The memory 940 can be any tangible, non-transitory computer readable storage medium, such as optical (e.g., CD, DVD, etc.), magnetic (e.g., tape), flash drive, hard drive, or other memory known in the art. In one embodiment, processor 920 may also be implemented entirely in hardware and not require any stored program to execute logic functions.

Alternatively, or in addition to the memory 940, the server 910 may access data or programmable logic from an external storage medium, for example through the communications subsystem 930.

The communications subsystem 930 allows the server 910 to communicate with other devices or network elements.

Communications between the various elements of the server 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a sensor apparatus, the method comprising:
calculating a value for a target function at the sensor apparatus, the target function being a weighted summation of a moving variance of three accelerometers at the sensor apparatus, the moving variance from each accelerometer being provided with an independent weighting value;
determining that the value of the target function is greater than a first threshold at a first moment;
finding that the value of the target function is greater than a second threshold for a first defined time period after the first moment, the second threshold being less than the first threshold;
based on the determining and finding, declaring an inflight state for the sensor apparatus; and
turning off transmission from a radio of the sensor apparatus based on the inflight state.

2. The method of claim 1, wherein each of the three accelerometers has a different orientation.

3. The method of claim 1, wherein the moving variance is calculated using a first order infinite impulse response filter.

4. The method of claim 1, wherein the independent weighting value for an X direction moving variance and the independent weight value for a Z direction moving variance are higher than the independent weighting value for a Y direction moving variance.

5. The method of claim 1, further comprising:
determining that the value of the target function is greater than a third threshold at a second moment;
finding that the value of the target function is lower than a fourth threshold for a second defined time period after the second moment;
declaring a landing status for the sensor apparatus; and
reactivating transmission from a radio of the sensor apparatus based on the landing status.

6. The method of claim 5, wherein the second defined time period is longer than the first defined time period.

7. The method of claim 1, further comprising verifying the inflight status using a second target function being greater than a fifth threshold, the second target function being defined as:

$$f_1(k)=\sin^{-1}(\sqrt{x_k^2+y_k^2}/9.8)$$

wherein $x_k$ and $y_k$ correspond to a magnitude of an accelerometer in an x direction and the magnitude of an accelerometer in the y direction at a moment k.

8. The method of claim 1, further comprising verifying the inflight status by periodically re-testing whether the target function is greater than the second threshold while the sensor apparatus is in the inflight state.

9. The method of claim 1, further comprising disabling functionalities on the sensor apparatus not associated with determination of the target function during the inflight state.

10. A sensor apparatus comprising:
a processor; and
a communications subsystem,
wherein the sensor apparatus is configured to:
calculate a value for a target function at the sensor apparatus, the target function being a weighted summation of a moving variance of three accelerometers at the sensor apparatus, the moving variance from each accelerometer being provided with an independent weighting value;
determine that the value of the target function is greater than a first threshold at a first moment;

find that the value of the target function is greater than a second threshold for a first defined time period after the first moment, the second threshold being less than the first threshold;

declare an inflight state for the sensor apparatus; and turn off transmission from a radio of the sensor apparatus based on the inflight state.

11. The sensor apparatus of claim 10, wherein each of the three accelerometers has a different orientation.

12. The sensor apparatus of claim 10, wherein the moving variance is calculated using a first order infinite impulse response filter.

13. The sensor apparatus of claim 10, wherein the independent weighting value for an X direction moving variance and the independent weight value for a Z direction moving variance are higher than the independent weighting value for a Y direction moving variance.

14. The sensor apparatus of claim 10, wherein the sensor apparatus is further configured to:

determine that the value of the target function is greater than a third threshold at a second moment;

find that the value of the target function is lower than a fourth threshold for a second defined time period after the second moment;

declare a landing status for the sensor apparatus; and reactivate transmission from a radio of the sensor apparatus based on the landing status.

15. The sensor apparatus of claim 14, wherein the second defined time period is longer than the first defined time period.

16. The sensor apparatus of claim 14, wherein the sensor apparatus is further configured to verify the inflight status using a second target function being greater than a fifth threshold, the second target function being defined as:

$$f_1(k) = \sin^{-1}(\sqrt{x_k^2 + y_k^2}/9.8)$$

wherein $x_k$ and $y_k$ correspond to a magnitude of an accelerometer in an x direction and the magnitude of an accelerometer in the y direction at a moment k.

17. The sensor apparatus of claim 10, wherein the sensor apparatus is further configured to verify the inflight status by periodically re-testing whether the target function is greater than the second threshold while the sensor apparatus is in the inflight state.

18. The sensor apparatus of claim 10, wherein the sensor apparatus is further configured to disable functionalities on the sensor apparatus not associated with determination of the target function during the inflight state.

19. A non-transitory computer readable medium for storing instruction code, which, when executed by a processor on a sensor apparatus cause the sensor apparatus to:

calculate a value for a target function at the sensor apparatus, the target function being a weighted summation of a moving variance of three accelerometers at the sensor apparatus, the moving variance from each accelerometer being provided with an independent weighting value;

determine that the value of the target function is greater than a first threshold at a first moment;

find that the value of the target function is greater than a second threshold for a first defined time period after the first moment, the second threshold being less than the first threshold;

declare an inflight state for the sensor apparatus; and turn off transmission from a radio of the sensor apparatus based on the inflight state.

* * * * *

UNITED STATES PATENT AND TRADEMARK OFFICE
CERTIFICATE OF CORRECTION

PATENT NO. : 11,653,126 B2
APPLICATION NO. : 17/303123
DATED : May 16, 2023
INVENTOR(S) : Cai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 42 days.

Signed and Sealed this
Twenty-third Day of July, 2024

Katherine Kelly Vidal
*Director of the United States Patent and Trademark Office*